Feb. 3, 1959    B. G. RICH    2,871,663
CRANKCASE VENTILATING SYSTEM AND DUPLEX
AIR CLEANER ESPECIALLY THEREFOR
Filed June 18, 1954
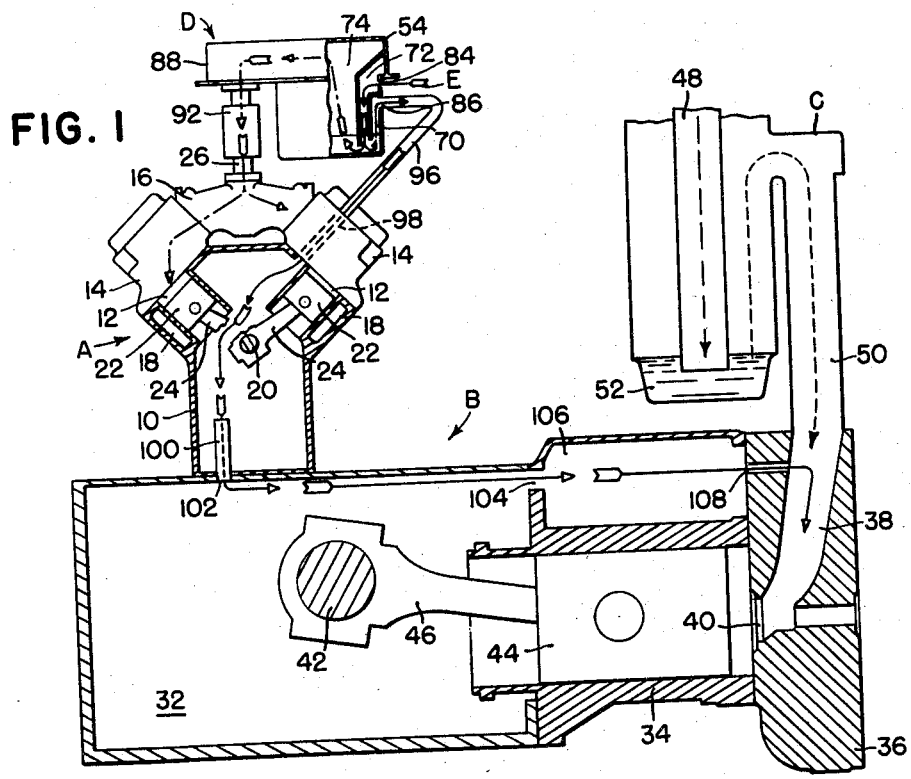
FIG. 1
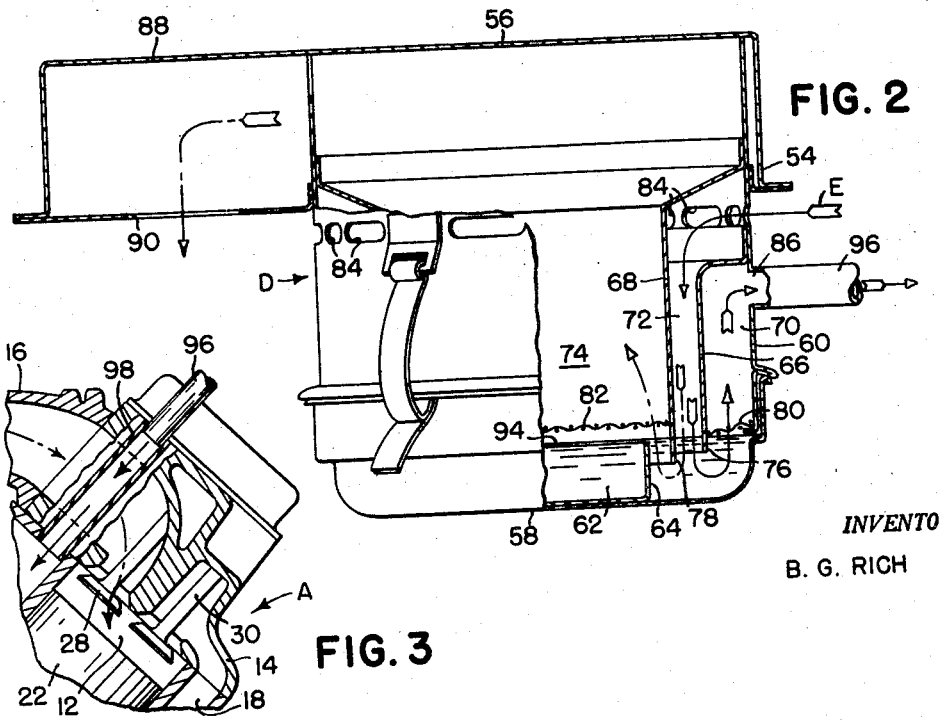
FIG. 2
FIG. 3
INVENTOR.
B. G. RICH

United States Patent Office 2,871,663
Patented Feb. 3, 1959

2,871,663

CRANKCASE VENTILATING SYSTEM AND DUPLEX AIR CLEANER ESPECIALLY THEREFOR

Barrett G. Rich, Waterloo, Iowa, assignor, by mesne assignments, to Deere & Company, a corporation of Delaware Application June 18, 1954, Serial No. 437,834

8 Claims. (Cl. 60—97)

This invention relates to the ventilating of the crankcase of an internal combustion engine by means of an air-flow connection to a cleaned-air zone of an air cleaner connected to another engine associated with the first engine. More particularly, the invention relates to a duplex air cleaner for association with two internal combustion engines arranged for operation independently of each other.

A typical example of the use of a pair of internal combustion engines occurs in diesel-powered equipment, such as tractors. In such case, the equipment or tractor is powered by a diesel engine of substantial capacity, and a smaller gasoline engine is carried by the equipment or tractor and is clutch-connectible to the diesel engine for starting purposes. That is to say, the gasoline engine is of relatively small size and is relatively easy to start, as compared with the starting ability of the diesel engine. Therefore, it is conventional to first start the small engine and then use it to motor the diesel engine until the diesel engine is conditioned to operate as an engine.

In the U. S. patent to Lowther 2,547,587, there is schematically illustrated an arrangement utilizing a gasoline engine and a diesel engine according to what has been said above, and the subject matter of that patent is devoted to the utilization of the air cleaner of the gasoline engine as a source of cleaned air for the purpose of effecting ventilation of the diesel engine crankcase. The basis of the system as disclosed in the Lowther patent, as well as is illustrated in modified form here, is that the diesel engine, when operating while the gasoline engine is not operating, draws off the crankcase vapors from both engines through a cleaned-air source initiated in the air cleaner of the small engine. Although the arrangement shown in the Lowther patent has proved successful in commercial installations, that system is subject to a major defect when applied to a combination of gasoline and diesel engines in which the gasoline engine is equipped with a venturi type carburetor having a float chamber, because, in such circumstance, it is possible for the diesel engine ventilating system to draw in uncleaned air through the exhaust manifold of the gasoline engine in the event that the gasoline engine has stopped with both its intake and exhaust valves open. If the gasoline engine is equipped with a carburetor of the self-lift type having an air valve, this disadvantage is not present, since the valve automatically closes the gasoline engine intake manifold or carburetor riser when the gasoline engine is stopped.

According to the present invention, the crankcase ventilating system depends on a duplex air cleaner which makes it impossible for the ventilating system to draw air from any other point except from a cleaned-air zone in the air cleaner, and the type of carburetor used on the starting or gasoline engine is wholly immaterial. This novel feature is accomplished relatively economically by the provision of a duplex air cleaner having a single air inlet and a pair of separate air outlets, one of which leads to the air intake system of the gasoline engine and the other of which provides a cleaned-air source for the ventilating system. The two outlets are separated by a baffle or partition arrangement so associated with the liquid reservoir of the air cleaner that depression of the oil or liquid level by pressure drop in the ventilating system will condition the duplex air cleaner to supply clean air only to the ventilating system to the exclusion of the gasoline engine air intake system. Apart from the combination of the duplex air cleaner with the two engines, it is a feature of the invention to provide a duplex air cleaner of a simple and inexpensive character.

The foregoing and other important objects and desirable features inherent in and encompassed by the invention will become apparent as a preferred embodiment of the invention is disclosed in the following detailed description and accompanying sheet of drawings, the several figures of which will be described immediately below.

Fig. 1 is an over-all functional diagram, partly in section, of the two engines, associated in a representative conventional manner and combined to utilize the advantages of the duplex air cleaner.

Fig. 2 is an enlarged view, partly in section, of the duplex air cleaner.

Fig. 3 is a fragmentary sectional view, on an enlarged scale, showing the cylinder head and manifolding arrangement of the small or gasoline engine.

Since the illustration, particularly in Fig. 1, is largely schematic, it should be taken as representative and not limiting. Similarly, reference to the engines as being fueled by gasoline or diesel fuel should not be understood as excluding the applicability of the invention to engines of other types or engines that use other fuels.

The small or gasoline engine is designated generally by the letter A and comprises a crankcase 10 having a pair of cylinders 12 arranged as a V. Each cylinder has a cylinder head 14, interconnected by a common intake manifold 16 and having individual exhaust manifolds 18. As already suggested, the arrangement is only representative of many forms that could be assumed by other engines deemed to be the equivalent of the engine A.

The engine A has a crankshaft 20 and pistons 22 operate in the usual manner in the cylinders 12, being connected to the crankshaft 20 by connecting rods 24. The intake manifold 16 has a carburetor riser 26 and the fuel mixture through the intake manifold 16 is supplied to the combustion chambers in the usual manner via intake valves, one of which is shown at 28 in Fig. 3. Also shown in Fig. 3 is one of the several exhaust valves, designated generally by the numeral 30.

The large or diesel engine has a crankcase 32 and one or more cylinders 34, the engine being of the type in which the cylinders are arranged horizontally rather than vertically, as in U. S. patent to McCray 1,919,069, which is largely immaterial. The cylinder 34 has a cylinder head 36 in which is formed an intake passage 38 that communicates with the combustion chamber via a valve port 40, from which the conventional valve has been omitted in the interests of clarity. A crankshaft 42 reciprocates a piston 44 in the cylinder 34 by means of a connecting rod 46.

Associated with the air intake system of the diesel engine B is a conventional form of oil-bath air cleaner, designated generally by the letter C. This cleaner has an air inlet 48 and a cleaned-air outlet 50, which outlet is connected in any suitable manner to the intake passage 38 in the cylinder head 36 of the engine B. The lower part of the cleaner C contains a reservoir or supply of liquid, as at 52, oil being the conventionally preferred liquid for this purpose.

Supported on the gasoline engine A is a duplex air cleaner designated generally by the letter D. This cleaner comprises a casing 54 having a top 56, a bottom 58 and side wall structure 60 joining the top and bottom and providing at the lower part of the casing a reservoir 62 in which is mounted a baffle 64. A partition or first inner wall 66 and a second partition or second inner wall are arranged within the casing 54 to divide the interior of the casing into three chambers 70, 72 and 74. Since the partitions 66 and 68 are circular in the form of the cleaner illustrated here, the chamber 74 is cylindrical and the chambers 70 and 72 are annular. The manner in which the partitions 66 and 68 are joined to the interior of the casing is deemed to be obvious without further description. Suffice it to say that these partitions combine with the top, bottom and side wall structure of the casing to provide the three chambers mentioned.

The partitions 66 and 68 respectively have lower terminal edges 76 and 78 and the chambers 70 and 74 thus open at their bottoms to the reservoir 62. These chambers are respectively screened at 80 and 82 and each chamber would conventionally carry a suitable filter element, omitted here in the interests of clarity.

The casing 54 is perforated at a level substantially above the reservoir 62 so as to have a plurality of air inlet holes or openings 84, which openings are in communication with or lead into the chamber 72; hence, the chamber 72 may be designated as an air inlet chamber. The casing 54 has an air outlet 86 leading into or communicating with the outer chamber 70, which may thus be considered as an air outlet chamber. Since the chambers 70 and 72 are separated by the partition or inner wall 66, the inlet 84 and outlet 86 are separate; although, as will appear subsequently, communication between the two may be established around the lower edge 76 of the partition 66.

The top 56 of the casing 54 has an extension 88 in the underside of which is an air outlet opening 90. This outlet is connected to the gasoline engine intake riser 26 by means of a carburetor, shown diagrammatically at 92 in Fig. 1.

The reservoir 62 normally carries liquid, such as oil, a representative level of which is indicated by the numeral 94. The extension 88, together with its air outlet 90, establishes an air-flow duct from the outlet chamber 74 to the intake system 26—16—12 of the engine A. A second air-flow duct means comprises a conduit or tube 96 connected at one end to the air outlet 86 of the duplex air cleaner 70 and at its other end to a tube 98 that extends through the gasoline engine cylinder head 14 independently of the intake manifold 16. The tube 98, as will be clearly apparent, opens into the upper portion of the chamber formed by the gasoline engine crankcase 10. The small engine crankcase 10 is in communication with the crankcase 32 of the large engine B by means of a tube 100 which extends through an opening 102 in the adjoining walls of the two crankcases. The purpose of the tube 100 is to provide an air inlet means above the normal lubricant level in the engine A. Except for the fact that it is desirable to ventilate the crankcase 10, the tube 100 could be connected directly to the tube 98. As it is, however, air flowing through the conduit 96 in the direction of the full-line arrow will pass through the crankcase 10 of the engine A and thence through the tube 100 and opening 102 into the crankcase 32 of the engine B, whence it will pass through air-transfer passage means comprising an aperture 104, a chamber 106 and a second aperture 108, the latter being of a somewhat restricted nature and opening into the intake passage 38 of the engine B. The chamber 106 is representative of a chamber or housing in which might be mounted valve-operating means or other mechanism which, being in the path of the air flow designated by the full-line arrows, will be ventilated along with the crankcases 10 and 32. As stated above, the arrangement is schematic and any other arrangement could be used to utilize the benefits of the invention.

In operation, the duplex cleaner D furnishes cleaned air not only for the gasoline engine while it is operating but for the ventilating system while the diesel engine is operating and the gasoline engine is not. That is to say, the duplex air cleaner includes a first cleaned-air zone or chamber 74 and a second cleaned-air zone or chamber 70. When the gasoline engine is initially started—during which time the diesel engine will not be running—air at atmospheric pressure will be taken into the duplex air cleaner via the air inlet 84, as represented by the arrow E. Because of the suction or low pressure created in the intake system of the engine A, the oil level 94 will be depressed and the incoming air will enter the chamber 74, as is conventional, being cleaned as it bubbles through the oil and as it passes through the filter element (not shown here) on its way through the extension 88 and out the air outlet 90, whence it passes through the carburetor 92, riser 26 and manifold 16 to be consumed in the combustion chambers of the cylinders 12. The dot-dash arrows show the air flow just described. Ignoring for the moment the duplex character of the cleaner D, the operation just outlined is not unconventional.

Because the depression in the cleaned-air zone or chamber 74 is sufficient to interconnect the chambers 74 and 72, it is likely that the chamber 74 will as well be connected to the other outlet chamber 70, because the chamber 70 is theoretically open to the atmosphere because of the air-flow passage 96—98—10—100—104—106—108—38—50—48, but in normal practice the several restrictions in the passage means just referred to will be so great that little if any benefits will be obtained. Whether or not such result will occur is largely immaterial, because the operation of the small engine is of relatively short duration. This is a characteristic of the the arrangement shown in the above-identified Lowther patent, in which the air cleaner C is used as a cleaned-air source for ventilating the crankcases in reverse during operation of the small engine, in which case the air flow from the cleaner C will follow the dotted arrow and will then travel in the direction just the reverse of that indicated by the full-line arrows.

As is conventional, the gasoline engine, while running, is clutch-connected to the diesel engine for motoring the diesel engine until it is capable of running under its own power, after which the gasoline engine is disconnected from the diesel engine and is stopped. While the diesel engine is operating, the low pressure created in its intake system will create a suction in the direction of the full-line arrows, the pressure in the intake system of the engine B being, of course, lower than the atmospheric pressure at the air inlet 84 of the duplex cleaner D. The depression in the duplex cleaner will be sufficient to lower the oil level in the compartment 72 until air entering at the air inlet 84 (arrow E) bubbles through the oil in the reservoir 62 and passes upwardly into the chamber 70 around the lower edge 76 of the partition 66. The partition 68 extends into the reservoir to a depth below the oil level 94 greater than the depth to which the lower edge 76 of the partition 66 extends. Hence, depression in the air cleaner in response to the low pressure in the engine B results, as it were, in uncovering the air inlet chamber 72 and air outlet chamber 70 without uncovering the bottom of the other air outlet chamber 74. Hence, the liquid or oil in the reservoir 62 acts as a valve between the three chambers, functioning to prevent communication between the chambers 72 and 74 while permitting communication between the chambers 72 and 70. Hence, communication between the chamber 70 and the air intake system of the small engine A is prevented, making it immaterial whether the carburetor 92 of the small engine is equipped with a float valve, an air valve or any other type of valve. Therefore, if the small engine happens to stop with its intake and exhaust valves 28 and 30 open (Fig. 3) dirty air cannot be taken in through the exhaust manifold, thus eliminating the defect that is possible in the Lowther system when that system is used with an engine combination in which the gasoline engine is equipped with a carburetor that does not have a check valve effective automatically to cut out the small engine air intake system.

Various expressions used here and in the claims have already been adequately defined. However, in the interests of clarity, it may be well to indulge somewhat in repetition of the definition of the air intake system of the engine A as comprising the carburetor 92, the riser 26, the manifold 16 and the intake valve 28. The air intake system of the engine B is represented at 50—38—40. The air-transfer passage means between the two crankcases comprises 100—102. The air-flow duct means between the cleaner D and the engine A is represented at 88—90—92—26, and the second air-flow duct means between the cleaner D and the crankcase 10 of the engine A is in communication with the crankcase 32 of the engine B via third air-flow duct means 104—106—108.

As already defined, the air cleaner D has first and second cleaned-air zones 74 and 70, the exit end of the first air-flow duct means 88—90—92 being represented by the connection of the outlet 90 to the carburetor 92. The entrance end of the air-flow duct means 88—90—92 is defined at 74—68, extending into the reservoir at the depth represented by the lower edge 78 of the partition 68.

The operation of the system as illustrated depends upon the pressure differential between the air intake system of the engine B and the air inlet 84, which differential here is the pressure drop between atmospheric pressure at 84 and sub-atmospheric pressure at 38, for example. However, the invention contemplates the use of a system in which pressure at 84, for example, may be higher than atmospheric, as in instances in which air is supplied by a pump as in the U. S. patent to McCormick 2,410,514.

The duplex cleaner may be considered in its entirety as defining an air-cleaning chamber, and the suction-responsive means as represented by the baffling or partitioning means 66—68 in association with the liquid level 94 which, as already described, functions as a valve for controlling the relationship between the chambers 70, 72 and 74.

Various other characteristics of the invention, as well as specific features thereof not categorically enumerated herein, will readily occur to those versed in the art, as will modifications and alterations in the preferred embodiment of the invention disclosed, all of which may be achieved without departing from the spirit and scope of the invention.

What is claimed is:

1. In combination: first and second internal-combustion engines operative independently of each other, each engine having its own crankcase and its own air-intake system; means providing an air-transfer passage interconnecting the crankcases; a duplex air cleaner having an air inlet and first and second separate air outlets connected in parallel to the air inlet; first air-flow duct means connecting the first air outlet to the air-intake system of the first engine exclusively of the crankcases of both the first engine exclusively of the crankcases of both engines and exclusively of the second engine air-intake system; second air-flow duct means connecting the second air outlet to the first engine crankcase exclusively of the first engine air-intake system; and third air-flow duct means connecting the second engine crankcase to the second engine air-intake system so that, during a condition in which the second engine is operating and the first engine is not operating, the second engine air-intake system will be subjected to sub-atmospheric pressure and the duplex air cleaner air inlet will be open to at least atmospheric pressure and air entering the inlet passes through the duplex air cleaner and exits through the second air outlet of said duplex air cleaner to the exclusion of the first air outlet and be caused to flow through the second air-flow duct means, the first engine crankcase, the air-transfer passage means, the second engine crankcase and the third air duct means in series to the second engine intake system.

2. In combination: a first internal-combustion engine having an air-intake system; a second internal-combustion engine having an air-intake system, a crankcase and air-transfer passage means connecting said crankcase and said second engine air-intake system; said engines being arranged for operation of either independently of the other; an air cleaner having therein air-cleaning means providing first and second separate cleaned-air zones; first air-flow duct means connecting the first cleaned-air zone exclusively to the first engine air-intake system; and second air-flow duct means connecting the second cleaned-air zone to the second-engine crankcase so that sub-atmospheric pressure developed in the air-intake system of the second engine during operation of said second engine exclusively of the first engine will cause cleaned-air to flow exclusively from said second cleaned-air zone via the second air flow duct means, the second engine crankcase and the air-transfer passage means into said second engine air-intake system.

3. In combination: a first internal-combustion engine having an air-intake system; a second internal-combustion engine having an air-intake system, a crankcase and air-transfer passage means connecting said crankcase and said second engine air-intake system; said engines being arranged for operation of either independently of the other; and an air cleaner comprising a casing having a lower part providing a reservoir adapted to contain liquid at a certain level, said casing having an air inlet directed downwardly toward the reservoir so that the reservoir liquid is exposed to said inlet, said air cleaner further having a first air-flow duct means including an exit end connected to the first engine air-intake system and an entrance end entering the casing and depending into the reservoir and a second air-flow duct means including an exit end communicating with the second engine crankcase and an entrance end entering the casing and depending into the reservoir, said entrance ends communicating in common with said inlet via the reservoir, the entrance end of the first duct means depending to a depth below the liquid level greater than the depth to which the entrance end of the second duct means depends so as to require a greater depression of the liquid level to uncover the entrance end of said first duct means than the depression required to uncover the entrance end of the second duct means, whereby, during operating of the second engine independently of the first engine, sub-atmospheric pressure developed in the second engine air-intake system will operate via the air-transfer passage means, second engine crankcase and second duct means to depress the air cleaner liquid level sufficiently to uncover the entrance end of only the second duct means for effecting air-flow communication between the air cleaner inlet and the entrance end of the second duct means while the entrance end of the first duct means remains covered so as to prevent communication between the first and second duct means.

4. In combination: a first internal-combustion engine having an air-intake system; a second internal-combustion engine having an air-intake system, a crankcase and air-transfer passage means connecting said crankcase and said second engine air-intake system; said engines being arranged for operation of either independently of the other; an air cleaner comprising a casing having a lower part providing a reservoir adapted to contain liquid at a certain level, said casing having an air inlet directed downwardly toward the reservoir so that the reservoir liquid is exposed to said inlet, said air cleaner further having a first air-flow duct means including an exit end connected to the first engine air-intake system and an entrance end entering the casing and depending into the reservoir and a second air-flow duct means including an exit end communicating with the second engine crankcase and an entrance end entering the casing and depending into the reservoir, said entrance ends of the duct means depending past the liquid level to different depths so as to enable sub-atmospheric pressures developed in the air-intake system of the second engine while operating independently of the first engine to depress the liquid level in the reservoir sufficiently to uncover only the entrance end of the second duct means while the entrance end of the first duct means remains covered so as to establish a block against communication between the first and second duct means.

5. In combination: a first internal-combustion engine having an air-intake system; a second internal-combustion engine having an air-intake system, a crankcase and air-transfer passage means connecting said crankcase and said second engine air-intake system; said engines being arranged for operation of either independently of the other; an air cleaner having means defining an air-cleaning chamber including an air inlet open to at least atmospheric pressure and leading into said chamber and first and second air outlets leading from the chamber separately and respectively to the first engine air-intake system and to the second engine crankcase, whereby independent operation of the first engine incurs a pressure drop between the chamber and the first engine air-intake system via the first outlet and independent operation of the second engine incurs a pressure drop between the chamber and the second engine air-intake system via the second outlet, second engine crankcase and the air-transfer passage means, and suction-responsive passage means in the air-cleaning chamber operative in response to the pressure drop incurred by independent operation of the second engine to establish a condition in which the second outlet is open to the chamber and the first outlet is closed to the chamber so that the second outlet communicates with the chamber to the exclusion of the first outlet and is thereby prevented from drawing air from the first engine intake system via said first outlet.

6. A duplex air cleaner, comprising: a casing having a lower part providing a reservoir adapted to contain liquid at a certain level, said casing having an air inlet directed downwardly toward the reservoir so that the reservoir liquid is exposed to said inlet, said casing further having first and second separate cleaned-air outlet ducts adapted to be connected to separate sources of sub-atmospheric pressure, and said ducts separately entering the casing and depending into the reservoir at different depths below the liquid level so that predetermined sub-atmospheric pressure in the duct depending to the lesser depth will depress the liquid level below said duct without depression of the level below the duct that depends to the greater depth.

7. A duplex air cleaner, comprising: a casing defining an air-cleaning chamber having an air inlet open to atmospheric pressure or above and leading into the chamber and first and second separate air outlets connected in parallel to the chamber and adapted to be independently connected to separate sources of sub-atmospheric pressure, and suction-responsive means in the air-cleaning chamber operative in response to a predetermined pressure drop across the chamber between the air inlet and one outlet to establish a condition in which said one outlet communicates with the air inlet to the exclusion of the other outlet.

8. A duplex air cleaner, comprising: a casing having a top, a bottom and side wall structure joining the top and bottom and providing the lower part of the casing with a reservoir adapted to contain liquid at a certain level; first and second spaced apart partitions in the casing and combining with the top and side wall structure to divide the casing into first, second and third air chambers, said partitions respectively having lower edges terminating short of the casing bottom and below the liquid level so that all of the chambers are open at their bottoms to the reservoir but are separated from each other by liquid in the reservoir at the aforesaid level; said casing having a first air-outlet opening into the first chamber above the liquid level and adapted for connection to a first sub-atmospheric pressure source, a second air outlet opening into the second chamber above the liquid level and adapted for connection to a second sub-atmospheric pressure source independent of the first outlet and first source, and an air inlet leading into the third chamber above the liquid level and subject to at least atmospheric pressure; and one of said partitions having its lower edge portion depending below the liquid level to a greater depth than the lower edge portion of the other partition.

References Cited in the file of this patent
UNITED STATES PATENTS

| | | |
|---|---|---|
| 1,946,291 | Miller | Feb. 6, 1934 |
| 2,543,200 | Rich et al. | Feb. 27, 1951 |
| 2,547,587 | Lowther | Apr. 3, 1951 |
| 2,655,221 | Russell | Oct. 13, 1953 |
| 2,660,261 | Jeffrey | Nov. 24, 1953 |